(12) United States Patent
Barton et al.

(10) Patent No.: US 6,503,432 B1
(45) Date of Patent: Jan. 7, 2003

(54) PROCESS FOR FORMING MULTILAYER ARTICLES BY MELT EXTRUSION

(75) Inventors: Kelly D. Barton, Athens, PA (US); Donald G. Gray, Towanda, PA (US); Guy E. Rockwell, Ulster, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/517,298

(22) Filed: Mar. 2, 2000

(51) Int. Cl.$^7$ .............................................. B29C 47/00
(52) U.S. Cl. .............................. 264/173.16; 264/177.2; 264/211; 264/331.14
(58) Field of Search ......................... 264/173.16, 177.2, 264/211, 310, 331.14, 171.14; 156/244.11; 429/122

(56) References Cited

U.S. PATENT DOCUMENTS

| | | | |
|---|---|---|---|
| 4,080,728 A | 3/1978 | Buckler | 29/623.4 |
| 4,177,552 A | 12/1979 | Gordon et al. | 29/623.4 |
| 4,379,814 A | 4/1983 | Tsien et al. | 429/42 |
| 4,614,026 A | 9/1986 | Plasse | 29/623.3 |
| 4,818,643 A | 4/1989 | Cook et al. | 429/188 |
| 5,013,619 A | 5/1991 | Cook et al. | 429/189 |
| 5,049,478 A | 9/1991 | Koch et al. | 430/270 |
| 5,217,827 A | 6/1993 | Fauteux et al. | 429/192 |
| 5,238,758 A | 8/1993 | Lee et al. | 429/191 |
| 5,316,556 A | 5/1994 | Morris | 29/623.3 |
| 5,332,649 A | 7/1994 | Bleckmann et al. | 430/270 |
| 5,348,824 A | 9/1994 | Duval | 429/192 |
| 5,582,954 A | 12/1996 | Swatton et al. | 430/281.1 |
| 5,593,462 A | 1/1997 | Gueguen et al. | 29/623.3 |
| 5,622,792 A | 4/1997 | Brochu et al. | 429/192 |
| 5,697,145 A | 12/1997 | Fukumura et al. | 29/623.5 |
| 5,725,822 A | 3/1998 | Keller et al. | 264/211.11 |
| 5,749,927 A | 5/1998 | Chern et al. | 29/623.5 |
| 5,827,331 A | 10/1998 | Block et al. | 29/623.5 |
| 6,287,722 B1 * | 9/2001 | Barton et al. | |

FOREIGN PATENT DOCUMENTS

| | | |
|---|---|---|
| DE | 19713072 | 10/1998 |
| WO | WO 99/34466 | 7/1999 |
| WO | WO00/51806 | 9/2000 |

* cited by examiner

*Primary Examiner*—Mark Eashoo

(57) ABSTRACT

Multilayer articles, particularly multilayer articles having electrical or ionic conductivity, are made using an improved melt extrusion process. The process includes a combination step in which a macroscopically homogeneous mass is formed prior to introduction into an extruder. The multilayer article may include an electrode layer and a separator layer that are extruded onto a metal current collector. Such structures are particularly useful in lithium-ion batteries.

12 Claims, 1 Drawing Sheet

PROCESS FOR FORMING MULTILAYER ARTICLES BY MELT EXTRUSION

BACKGROUND OF THE INVENTION

1. Field of the Invention

The present invention relates to a melt extrusion process for making multilayer articles, particularly multilayer articles having electrical or ionic conductivity. The articles are suitable for use in electrochemical applications, such as batteries, fuel cells, electrolysis cells, ion exchange membranes, sensors, electrochemical capacitors, electrochromic windows, and modified electrodes. Of particular interest is the use in lithium-ion batteries.

2. Description of the Related Art

A battery can be made of one or more cells, usually connected to achieve a particular voltage and/or capacity. A cell includes three major components: the positive electrode, the negative electrode, and an electrolyte. A porous, polyolefin-based separator is also commonly present to prevent electrical contact between the two electrodes. In practice, a cell often also contains anode and cathode current collectors which are conductive layers, usually metallic, each of which will have tabs for external connection. A battery often also requires a package which may contain several individual cells and out of which the tabs will protrude.

Lithium-ion polymer battery cells utilize electrode elements comprising flexible sheets of polymeric composition in which are dispersed finely-divided particulate materials capable of reversibly intercalating lithium ions during battery charge/discharge cycles. The polymeric materials in the electrodes and the separator element are generally the same or similar to provide adhesion between the layers in the cell.

Solvent coating is often employed to produce the individual layers for a lithium-ion polymer battery, followed by lamination of the layers to form cells. However, solvent coating has process limitations resulting in defects such as bubbles due to high drying rates; pinholes due to entrapped air or surface tension defects; settling of suspended solids during solution storage or handling; flooding and floating of suspended solids during drying; gelation of thermodynamically unstable solutions; and cracking due to shrinkage stresses during drying.

Melt extrusion processes to form multilayer articles from polymeric materials are known in the art. They include co-extrusion processes in which multiple feed streams are extruded through a single-slot die. In one kind of co-extrusion process, multiple feed streams are introduced into a feed block and then into the die. In a second type of co-extrusion process, the multiple streams are introduced into a multi-manifold, single-slot die. Another melt extrusion process is a multilayer extrusion coating process in which the feed streams are introduced into a multi-manifold multi-slot die.

Melt processes, particularly melt extrusion processes, offer lower investment and higher capital productivity as compared with solvent coating processes. Multilayer extrusion processes offer the additional advantage of fewer process steps and further increased productivity.

On the other hand, a disadvantage to extrusion, as practiced in the existing art, is the requirement of melting the polymer at relatively high temperatures, making it difficult to process any volatile liquids or thermally unstable materials. Another disadvantage to extrusion as practiced in the existing art, is that mixing is carried out in the molten state; imposing high shear stresses on the mixtures. This can cause degradation of some of the desired properties of the composition.

Therefore, there is a need for an improved multilayer extrusion process which is suitable for materials sensitive to heat and/or shear stress.

SUMMARY OF THE INVENTION

The present invention relates to a multilayer extrusion process that minimizes exposure of the components to shear and elevated temperatures. The process includes a combination step in which the components are combined to form a macroscopically homogeneous mass. This is done separately for the materials in each layer. Each of the macroscopically homogeneous masses are then fused to form plastically formable masses. At least two plastically formable masses are simultaneously forced through a die containing at least one slot onto a support to form a multilayer structure. The support can be a permanent support or a temporary support.

In a preferred embodiment of the invention, the die is a multislot die having multiple input manifolds and multiple slots, and the plastically formable material from each extruder is extruded into a separate manifold of the die.

In a second preferred embodiment of the invention, the composition of at least one of the layers comprises an electrochemically active material, an electrically conductive material, and an ionically conductive mixture.

DETAILED DESCRIPTION OF THE PREFERRED EMBODIMENTS

Figure 1:
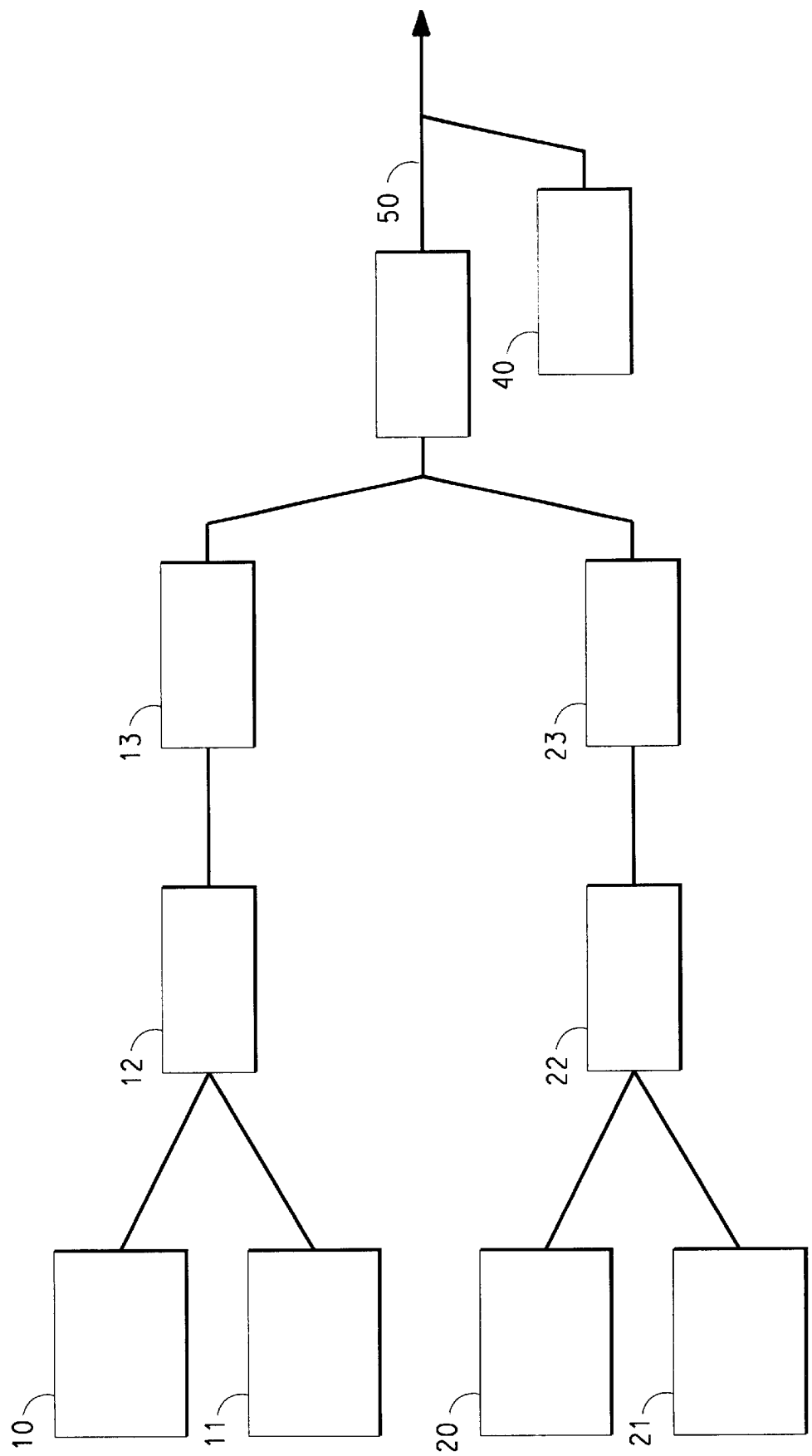
FIG. 1 is a block flow diagram of the process of the invention.

As used herein, the term "macroscopically homogeneous" is intended to mean that the composition has, a uniform appearance to the naked eye (i.e., without the use of a microscope). While a macroscopically homogeneous mass is a precursor to a plastically formable mass, it is not itself plastically formable. It is a particle mixture held together by weak forces—electrostatic attractions, surface tension, etc. It does not possess bulk mechanical properties associated with a continuous material, such as viscosity or elasticity. A macroscopically homogeneous mixture typically is not uniform enough to display acceptable levels of such desirable end-use properties as cohesive strength, electrical conductivity, ionic conductivity, and the like, to make it useful as an article without further processing.

As used herein, the term "plastically formable" is intended to mean a mass that can be molded to a shape by the application of heat and/or stress, and which will retain the shape to which it has been molded upon removal of the heat and/or stress by which it was formed. A plastically formable mass displays bulk mechanical properties such as viscosity and/or elasticity, and possesses adequate uniformity to be useful in articles such as batteries, fuel cells, electrolysis cells, ion exchange membranes, sensors, electrochemical capacitors, electrochromic windows, and modified electrodes.

As used herein, a weight percentage of a component in a composition (wt %) is a percentage by weight based on the weight of the total composition.

The present invention relates to a multilayer extrusion process in which solid and liquid components, including a polymeric component having a fusing temperature, are combined to form a macroscopically homogeneous mass, fused, and forced through a die onto a support. The process is most advantageously used for materials which are sensitive to heat and/or shear stress. Examples of such materials will be obvious to one of skill in the art, and can include volatile liquids; thermal crosslinking agents; materials which decompose thermally or chemically or crosslink at relatively low temperatures; fragile particles, fibers, and agglomerates thereof; microencapsulated materials; polymers and biomolecules whose structures are degraded by shear stress; materials whose physical properties change under the influence of temperature or shear stress, and the like. The process of the invention is also useful for photosensitive compositions, which generally comprise a polymeric binder, ethylenically unsaturated monomers or oligomers, photoinitiators, and other additives. The photosensitive properties of the resulting composite structure depend upon the heat history. Materials which may be sensitive to heat or stress are commonly used in the art in the production of energy storage and conversion devices such as batteries, fuel cells, and supercapactiors, and other electrochemical devices such as multilayer electrochemical sensors, modified polymer film coated electrodes, liquid junction photovoltaic cells, polymer membrane electrolysis cells, and electrochromic windows. The process of the invention is particularly suited for the formation of multilayer composite structures useful in electrochemical applications, especially lithium-ion batteries.

A process of the invention is illustrated schematically in FIG. 1. Heat-stable dry component(s) of a first layer of a multilayer structure, are provided in a container 10. Heat-stable liquid component(s) are provided in a container 11. The dry component(s) and the liquid component(s) of the first layer are combined in a container 12 to form a macroscopically homogeneous first mass, which is fed into a first extruder 13, wherein the first mass is formed into a first plastically formable mass and extruded to form a first extruded mass. Similarly, heat-stable dry component(s) of the second layer of the multilayer structure, are provided in a container 20. Heat-stable liquid component(s) of the second layer are provided in a container 21. The dry component(s) and the liquid component(s) of the second layer are combined in a container 22 to form a macroscopically homogeneous second mass, which is fed into a second extruder 23, wherein the second mass is formed into a second plastically formable mass and extruded to form a second extruded mass. The first extruded mass and second extruded mass respectively from extruders 13 and 23 are forced into an extrusion die 30 to form a multilayer extrudate at location 50. A support 40 is provided to the multilayer extrudate, to form a multilayer composite structure.

It will be understood that there may be one or more than one component in containers 10, 11, 20 and 21.

Dry and Liquid Components

As used herein, the term "heat-stable" is intended to mean that the component properties are not deleteriously affected at the temperatures at which the process steps, such as extrusion step, are carried out. As used herein, the term "dry" is intended to mean that the component is a solid at room temperature. The dry component(s) and/or the liquid component(s) may optionally be treated to remove any residual undesired contaminant, frequently water. Any conventional treatment means can be used, such as the application of heat and/or vacuum, or the association with chemical or physical agents, so long as the properties of the materials are not deleteriously affected.

At least one of the dry components has a component fusing temperature at which the component becomes plastically formable. As used herein, the term "fusing temperature" is intended to mean the temperature at which a material coalesces to become plastically formable. It will be understood that the fusing temperature of a combined mass, including a component having a component fusing temperature as one of multiple ingredients, may be different from the component fusing temperature. The combined mass's fusing temperature may be affected by the presence of the other components in the layer, and on the level of applied stress. For example, the fusing temperature of a polymer is generally lowered by the addition of a plasticizing liquid. It is well known that when polymers flow, the effects of temperature and deformation rate are superimposed, so the mechanical conditions under which a polymer is processed can also affect its fusing temperature. The combination of the heat-stable dry component(s) and the heat-stable liquid component(s) is one which is fusible upon the application of heat and/or stress to form a plastically formable mass.

Where more than one dry component and/or more than one liquid component is provided in containers 10, 20, and 11, 21, it is understood that not all dry component(s) and not all liquid component(s) need to be provided in the respective containers 10, 20 and 11, 21 before they are combined in containers 12, 22, respectively. For example, depending upon the physical characteristics of the components, it may be preferable to provide some of the dry components into container 12 from container 10, while providing other dry components directly into container 12 without first placing it into container 10.

Combination Step

The macroscopically homogeneous masses formed in containers 12 and 22 generally include particles that are agglomerates of solid particles and liquid material.

It is understood that the combination step may be accomplished by merely placing the solid and liquid components into one container, without any additional mechanical mixing. For example, in one embodiment, mechanical mixing is not necessary where the amount (by volume) of the liquid components is substantially greater than the amount (by volume) of the solid components, such that filtration may be needed to separate the macroscopically homogeneous mass from the excess liquid components.

Container 12 and/or container 22 may optionally include a mixing device (not shown) where mechanical mixing may facilitate the combination step. In such a case, although not shown in FIG. 1, it is understood that the dry component(s) and liquid component(s) can be combined in one container and then mixed in a separate container. The preferred mixing device used to facilitate combining the components does not provide high shear stress. Examples of suitable mixing devices include paddle mixers, tumbling mixers, plough blade mixers, ribbon mixers and gravity mixers. When there is more than one dry component, it is frequently advantageous, although not necessary, to combine the dry components first and then add the liquid component(s). The mixing is generally carried out at ambient temperature, although the temperature may be above or below ambient temperature. The mixing temperature should be insufficient for the composition to fuse and form a plastically formable mass. In general, the application of heat should be minimized. Where mechanical mixing is used, the time of mixing will depend upon the nature of the components being blended and can vary greatly. Once a macroscopically homogeneous mass is formed, further mixing often will not increase the homogeneity of the mass. In some cases, over-mixing can cause segregation of the components and actually decrease homogeneity.

Fusing Steps

The fusing step can be accomplished through any means that converts the macroscopically homogeneous masses into plastically formable masses. Fusing steps are often performed with the application of heat and/or pressure. Even though the illustrated embodiment describes a process wherein the fusing of the first mass and second mass are accomplished in extruders, one of ordinary skill in the art understands that the first mass and/or second mass could be fused or partially fused before their introduction into the extruders, in multiple extruders, or entirely without an extruder.

It is further understood that, additional solid and/or liquid components, especially those that are not sensitive to shear stress, may be added to the macro-scopically homogeneous mass during the fusing step. These additional components should not significantly increase the shear stress and/or residence time required to form a plastically formable mass, and thereby detract from the advantages provided by the formation of the macroscopically homogeneous mass before the fusing step.

The introduction of the macroscopically homogeneous first and second masses (and any additional components) to the respective extruders 13 and 23 can be accomplished batch-wise, or continuously using a metering device. Methods for the introduction of materials into extruders are well known, and include auger feeders, belt feeders, vibrating hoppers and chutes, buckets, etc.

For example, a useful extruder is a device containing a mixer that is capable of applying sufficient heat and/or stress to fuse the mass within, followed by means of conveying the plastically formable mass. In general, all such devices share the common elements of converting the macroscopically homogeneous mass into a plastically formable mass by the application of heat and/or stress, then conveying the mass to a device for plastically forming the mixture into a desired shape.

Typically, the extruder is a single screw extruder or a multi-screw extruder and may be oriented vertically or horizontally. The mass is introduced into the feed throat of the extruder, which may optionally have a stuffing device to prevent bridging of solids over the feed throat. A mechanism may be provided after the extruder to convey the plastically formable mass, such as a pump or piston.

It is sometimes desirable to preheat the extruders 13, 23 before introducing the macroscopically homogeneous masses into the container. The temperature to which the extruder is preheated can be up to the fusing temperature of the macroscopically homogeneous masses, and therefore is dependent upon the composition of the macroscopically homogeneous masses.

The macroscopically homogeneous mass is transported from the feed zone of the extruder into the compression zone of the extruder where the mass is fused to form a mass that is plastically formable. This is accomplished by using the extruder screw(s) to transport the mass into a region of decreasing screw free volume, i.e., the space in the extruder cavity not filled by the screw itself. For a single-screw extruder, the compression ratio is generally in the range of 1:1 to 5:1, although other ratios may be used. The compression ratio refers to the reduction in free volume per unit length along the screw axis, from the feed zone to the zone where compression is greatest. Alternatively, particularly for a twin-screw extruder, the compression and fusing step may be accomplished at the tips of the screw where the macroscopically homogeneous mass is forced into a confined space with decreasing cross-sectional area.

The fusing temperature required in the first extruder will depend on the nature of the components in the macroscopically homogeneous first mass and the stress imposed by the process. The temperature should be high enough so that the combination of temperature and stresses in the extruder causes the macroscopically homogeneous mass to fuse into a plastically formable mass. However, the temperature should not exceed the temperature at which the most heat-sensitive component is affected, and the stress history should not exceed the level at which the most stress-sensitive component is affected. In general, the temperature of the extruder will be kept as low as possible while still achieving a plastically formable mass. In some cases the shear heating due to forcing the mass through the compression process is sufficient and it is unnecessary to supply additional heat to the extruder.

It is preferred that the residence time in the extruder should also be kept at the minimum necessary to achieve a plastically formable mass.

Extrusion Die

In one embodiment, the die 30 is a simple single-slot die which is preceded by a feed block (not shown). The individual extrudates are forced into the feed block where they are combined. The multilayer material from the feed block is forced through the die at location 50, where the final thickness and width are achieved. In general, conditions are chosen so as to maintain a smooth interface between the layers, and so the layers cast by the die are of uniform thickness.

Alternatively, the die may be a multi-manifold single-slot die and the feed block eliminated. The multi-manifold die has multiple channels for spreading the input streams. The multiple manifolds feed into a single slot, where the layers are combined into a multilayer structure, and through which the multilayer structure is forced onto the support.

In a preferred embodiment, the die is a multi-manifold multi-slot die. Each of the extrudates is fed into an individual manifold, where it is spread, and then through a separate slot in the die. The layers do not combine until after they are extruded through the die. Advantageously, this type of multilayer extrusion coating makes it possible to form multilayer structures from materials that vary widely in viscosity, and structures with layers having very different final thicknesses.

Support

The support 40 can be temporary or permanent. Examples of suitable temporary supports include casting rolls, casting belts and releasable substrates. A casting roll or belt is generally used in a continuous process to transport the multilayer structure to the permanent support. Any material that is stable and non-reactive at the temperature used and that will release the structure may be used. Casting rolls and belts are typically made of durable, heat stable materials, and are provided with polished or plated metal surfaces so as not to impair the surface of the cast materials. The outer surface of the casting roll or belt may be coated to prevent the cast material from adhering. The releasable substrates are usually polymeric films that are stable at the temperature of the structure as extruded, such as polyester, polyimide, and the like. The films frequently are treated with a release agent to facilitate removal. It is also possible to use papers, fibrous mats, metallic webs and other self-supporting sheets as the temporary support.

In one embodiment, a multilayer composite structure is forced through a die onto a temporary support, such that a first structure surface of the composite structure is adjacent the temporary support, wherein the first structure surface is opposing a second structure surface. The composite structure is then positioned such that the second structure surface is adjacent a second support. The temporary support is then removed.

Although FIG. 1 illustrates an embodiment in which a two-layer structure is formed, it is understood that structures having three or more layers may be formed analogously using additional components, combining units and extruders.

Lithium-Ion Battery

The process of the invention is particularly suited to the formation of multilayer structures that are useful in lithium-ion batteries, especially lithium-ion polymer batteries. Referring again to FIG. 1, the process can be adapted to make a lithium ion battery multilayer structure, for example, a multilayer structure comprising a separator layer and an electrode layer. Heat-stable dry component(s) of a separator are provided in container 10, and heat-stable liquid component(s) of a separator are provided in container 11. In addition, heat-stable dry component(s) of an electrode layer are provided in container 20, and heat-stable liquid component(s) of the electrode layer are provided in container 21.

Battery Dry and Liquid Components of Separator Element

It is frequently desirable to remove water from the components of the battery compositions, prior to combining them with the liquid components in containers 12, 22. For battery applications, it is desirable to remove water to an extent such that the final battery contains less than about 200 ppm $H_2O$, on a weight basis, before the first charge is applied. For hygroscopic materials such as lithium salts, e.g., $LiPF_6$, $LiBF_4$, $LiN(SO_2CF_3)_2$, $LiN(SO_2CF_2CF_3)_2$, etc., and ionomeric polymers, e.g., Li-PSEPVE, chemical means can be used to remove water during the manufacturing process. Alternatively, water can be removed with heat (e.g., 150–180° C.) under dry atmospheres (e.g., vacuum, inert gases or dry air at ~1–20 ppmv $H_2O$, etc.). Non-hygroscopic materials which possess only weak attractions for water can be dried to suitably low moisture levels by storage under a dry atmosphere. The application of heat accelerates the process. Some materials are not particularly hygroscopic, but bind water (e.g., $LiNi_xCo_yO_2$) and require heat to drive off bound water.

The dry components of the separator provided in container 10 generally comprise a polymeric material, and may optionally include inert fillers, mobile lithium salts, and other additives. Polymeric materials for lithium-ion polymer batteries are well known and include, for example, polyvinylidene fluoride (pVDF); copolymers of vinylidene fluoride (VDF) with other monomers such as hexafluoropropylene (HFP), tetrafluoroethylene (TFE), and chlorotrifluoroethylene (CTFE); polyalklene oxides; polyacrylonitrile; polyvinylpyrrolidinone; poly(tetraethylene glycol diacrylate) and other polymers and copolymers of acrylate and methacrylate esters; polymers and copolymers of tetrafluoroethylene; and ionomers, such as Nafion® perfluoroionomer (E.I. du Pont de Nemours and Company, Wilmington, Del.). The polymeric material used may function both as a separator and as an electrolyte.

A particularly suitable ionomer for use in a separator layer comprises monomer units of vinylidene fluoride and 2–50 mol-%, preferably 2–20 mol-%, more preferably 4–12 mol-%, of a perfluoroalkenyl monomer unit having a pendant group comprising the radical represented by formula (I) below:

$$-(OCF_2CFR)_aOCF_2(CFR')_bSO_2X^-(M^+)[YZ_c]_d \qquad (I)$$

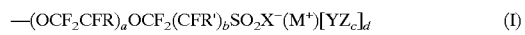

wherein
R and R' are independently selected from F, Cl or a perfluoroalkyl group having 1 to 10 carbon atoms, optionally substituted by one or more oxygen atoms;
a=0,1 or 2;
b=0 to 6;
$M^+$ is $H^+$ or a univalent metal cation;
X is O, C or N with the proviso that d=0 when X is O and d=1 otherwise, and c=1 when X is C and c=0 when X is N;
when c=1, Y and Z are electron-withdrawing groups selected from the group consisting of CN, $SO_2R_f$, $SO_2R^3$, $P(O)(OR^3)_2$, $CO_2R^3$, $P(O)R^3_2$, $C(O)R_f$, $C(O)R^3$, and cycloalkenyl groups formed therewith wherein $R_f$ is a perfluoroalkyl group of 1–10 carbon atoms optionally containing one or more oxygen atoms;
$R^3$ is an alkyl group of 1–6 carbon atoms optionally containing oxygen, or an aryl group optionally further substituted;
or, when c=0, Y may be an electron-withdrawing group represented by the formula $—SO_2R_f'$ where $R_f'$ is the radical represented by the formula (II) below:

$$-(R_f''SO_2N^-(M^+)SO_2)_mR_f''' \qquad (II)$$

where m=0 or 1, $R_f''$ is $C_nF_{2n}$ and $R_f'''$ is $C_nF_{2n+1}$ each optionally substituted by one or more hydrogens and where n=1–10.

Preferably, a=0 or 1, $R=CF_3$, R'=F, b=1, and when X is C, Y and Z are CN or $CO_2R^3$ where $R^3$ is $C_2H_5$, while when X is N, Y is preferably $SO_2R_f$ where $R_f$ is $CF_3$ or $C_2F_5$ and $M^+$ is $H^+$ or alkali metal cation. Most preferably $M^+$ is a lithium cation. Most preferred are lithium perfluorosulfonate ethoxy propyl vinyl ether (Li-PSEPVE) and the methide and imide derivatives thereof as hereinabove described.

The polymer may also comprise up to 20 mol-% of monomer units selected from the group consisting of tetrafluoroethylene, trifluoroethylene, chlorotrifluoroethylene, vinyl fluoride, hexafluoropropylene, perfluoromethyl vinyl ether, perfluoroethyl vinyl ether, ethylene, propylene, 1-octene, isobutylene, ethyl vinyl ether, acrylic acid and the alkyl esters thereof, and methacrylic acid and the alkyl esters thereof, and mixtures thereof.

Suitable inert fillers include non-swelling polymers, fibers, or porous substrates such as polyvinylidene fluoride (PVDF) homopolymer, polytetrafluoroethylene (PTFE) homopolymer, or polyolefins, solvent swellable polymers such as polyvinylidene fluoride-hexafluoropropylene copolymers, polyurethane, polyalkylene oxides, polyacrylonitrile, polymethyl methacrylate, or copolymers of any of these, and non-conducting ceramic particles such as $TiO_2$, $SiO_2$, zeolites, or $Al_2O_3$. Also included are nondissociating salts such as LiX, where X=halide or carbonate.

Mobile lithium salts that can be used in battery applications are well known and include $LiPF_6$, $LiPF_xR_{fy}$, $LiBF_4$, $LiAsF_6$, $LiClO_4$, lithium borates, $LiSO_3R_f$, $LiN(SO_2R_f)(SO_2R_f)$, $LiC(SO_2R_f)(SO_2R_f)(SO_2R_f)$, and mixtures thereof, where the "f" subscript denotes partial or complete fluorination. The $R_f$ groups are electron-withdrawing, and may respectively be the same or different from one another. Preferably $R_f$=$CF_3$, $CF_2CF_3$, or $C_4F_9$. Most preferred are $LiPF_6$ or $LiN(SO_2CF_2CF_3)_2$.

Preferably, the heat-stable liquid components for the separator provided in 11 include those that function as solvent/plasticizers, more preferably those that are aprotic polar solvent/plasticizers. Suitable aprotic polar solvents/plasticizers include linear and cyclic carbonates, esters, diesters, lactones, amides, sulfoxides, sulfones, and ethers and combinations thereof. Preferred are combinations of cyclic carbonates, diesters, or lactones, such as ethylene carbonate, propylene carbonate, butylene carbonate, vinylene carbonate, dimethyl succinate, diethyl succinate, dimethyl glutarate, dimethyl adipate, gamma-butyrolactone, fluoro or chloro-substituted cyclic carbonates mixed with linear carbonates such as dimethyl carbonate, diethyl carbonate, dipropyl carbonate, ethyl methyl carbonate, methyl propyl carbonate, and fluoro and chloro substituted linear carbonates. Especially preferred are combinations of ethylene carbonate and butylene carbonate, ethylene carbonate and dimethyl succinate, and of ethylene carbonate and propylene carbonate. Most preferred are mixtures of ethylene carbonate with butylene carbonate in weight ratios of from 50:50 to 80:20.

Additional liquid materials and dissolved or dispersed additives may also be included in container 11. Organic compounds, including aromatic compounds such as benzene derivatives, particularly substituted anisoles, can be added for safety-related purposes or overcharge/overdischarge protection for the battery. A porogen, such as a hydrocarbon oil or high boiling plasticizer such as dibutyl phthalate, may be added for subsequent extraction.

Dry and Liquid Components of Electrode Element

The dry components for the electrode layer provided in container 20 may include polymer, electrochemically active material, electrically conductive additive, and optionally a mobile lithium salt, other fillers and additives. The polymer may be chosen from any of the materials listed above for the separator, and preferably has the same composition or nearly the same composition as the polymer in the separator layer. In a preferred embodiment, the polymer is excluded from container 20, but added directly to container 22.

Electrochemically active materials for lithium-ion battery electrodes are well-known in the art. The electrochemically active material suitable for use in the process for forming an anode include carbons such as coke or graphite, metal oxides such as titanium oxides, iron oxides, or tin oxides or lithium-alloy-forming compounds of tin, silicon, antimony, or aluminum such as those disclosed in "Active/Inactive Nanocomposites as Anodes for Li-Ion Batteries," by O. Mao et al. in *Electrochemical and Solid State Letters*, 2 (1), p. 3, 1999. Particle size of the particulate active material should range from about 0.1 to 100 microns. Preferred are graphites such as carbon microbeads, natural graphites, graphite flake, or carbon fibers. Especially preferred are graphite microbeads such as those produced by Osaka Gas in Japan (MCMB 25–28, 10–28, or 6–28).

Suitable for use as an electrochemically active material in the cathode composition include transition metal oxides such as spinel $LiMn_2O_4$, layered $LiMnO_2$, $LiNiO_2$, $LiCoO_2$, $LiNi_xCo_yO_2$, and vanadium oxides such as $LiV_2O_5$, $LiV_6O_{13}$, or the foregoing compounds modified in that the compositions thereof are nonstoichiometric, disordered, amorphous, overlithiated, or underlithiated forms such as are known in the art. The suitable compounds may be further modified by doping with less than 5% of divalent or trivalent metallic cations such as $Fe^{2+}$, $Ti^{2+}$, $Zn^{2+}$, $Ni^{2+}$, $Co^{2+}$, $Cu^{2+}$, $Cr^{3+}$, $Fe^{3+}$, $Al^{3+}$, $Ni^{3+}$, $Co^{3+}$, or $Mn^{3+}$, and the like. Other electrode active materials suitable for the cathode composition include sulfur compounds such as solid sulfur, organic disulfides, or metal sulfides such as $TiS_2$ or $MoS_2$, electrically-conducting polymers such as polyaniline and its derivatives, polypyrrole derivatives, polyparaphenylene derivatives, polythiophene derivatives, or their copolymers, or mixtures of any of the above compounds. Particle size of the active material should range from about 1 to 100 microns. Preferred are transition metal oxides such as $LiMn_2O_4$, $LiNiO_2$, $LiCoO_2$, and $LiNi_xCo_yO_2$.

Suitable conductive additives for the electrode composition include carbons such as coke, carbon black, carbon fibers, and natural graphite, metallic flake or particles of copper, stainless steel, nickel or other relatively inert metals, conductive metal oxides such as titanium oxides or ruthenium oxides, electrically-conductive polymers such as polyaniline or polypyrrole, and combinations of these conductive additives. In one embodiment, carbons with relatively low surface area of about 100 $m^2$/g or less may be used, such as Super P and Super S available from MMM Carbon in Belgium. Super P carbon black has a surface area of 60 $m^2$/g. In another embodiment, Carbons possessing relatively high surface area (greater than about 200 $m^2$/g) may be used alone or in combination with other carbons. Surface area of carbons is generally determined by measuring gas absorption and using BET theory. Discussion of such measurements can be found in standard texts, such as *Chemical Engineers' Handbook*. Fifth Edition, Perry and Chilton, eds., McGraw-Hill (1973).

While it is known that carbons with relatively high surface provide superior resistance to degradation by shear during melt processing, it is usually undesirable to incorporate such carbons because these carbons include catalytic sites for undesirable side reactions with other battery ingredients, and thereby detract from battery performance. However, the process of the invention advantageously allows for incorporation of carbons with relatively high surface area, because a relatively small amount of carbon additives is needed for a desired conductivity. As such, carbons with relatively high surface area can be used in the inventive process without the deleterious effect on battery performance. One such carbon is Ensaco 350 available from MMM Carbon. Ensaco 350 has a surface area of 790 $m^2$/g.

Suitable inert fillers and mobile lithium salts include those listed above for the separator layer.

The liquid components for the electrode layer provided in container 21 can be selected from those listed above for the separator layer. In a preferred embodiment, the liquid component make up in container 21 is the same as that in container 11.

Combination Steps

Preferably, a mixing device is used to facilitate the combination in containers 12 and 22. In some cases it is more convenient to add the dry materials to a low-shear mixing device, as discussed above, mix them, and then add the liquid components by injection. In a preferred embodiment, the components are added in stages and in a specific order. All the dry components except for the polymer are combined in containers 12 and 22 and tumble mixed for about 10–60 minutes. The liquid components are then injected or added as an aerosol and tumble mixed with the dry components for 10–60 minutes. The polymer is then added last with a final tumble mixing for 10–60 minutes. Alternatively, the liquid components are added in two parts, with tumble mixing after each addition.

For the separator, the components are added in container 12 to achieve a macroscopically homogeneous mass having 10–80 wt % polymer, 0–60 wt % inert filler, 0–30 wt % mobile lithium salt, and 20–80 wt % solvent/plasticizer. The mixing is preferably carried out at room temperature. For an anode, the components are combined in container 22 to preferably achieve a macroscopically homogeneous mass having 4–20 wt % polymer, 40–90 wt % electrochemically active material, 1–10 wt % conductive additive, 8–30 wt % plasticizer/solvent, 0–10 wt % inert filler, and 0–20 wt % lithium salt, all by weight based on the total composition. Where the electrode is a cathode, the components are combined in container 22 to preferably achieve a macroscopically homogeneous mass having 4–20 wt % polymer, 40–90 wt % electrochemically active material, 1–15 wt % conductive additive, 8–30 wt % plasticizer/solvent, 0–10 wt % inert filler, and 0–20% lithium salt, all by weight based on the total composition. The mixing is preferably carried out at room temperature.

The mixing in containers 12, 22 preferably result in an increase in the bulk density. Densification of 50–100% can typically be achieved. By this it is meant that the bulk density of the mass is 50–100% greater than the average density of the starting components, where the average is calculated by weighting the component densities according to the relative amounts present in the mass. Each of the first and second macroscopically homogeneous masses thus formed is in the form of small grains of dry-appearing material and has a consistency between talc and sand. Each of the first and second masses is uniform and manageable. Each of the first and second masses thus formed would experience little or no settling during storage.

Fusing Steps

In a preferred embodiment, the extruders 13, 23 are each preheated to the fusing temperature of the respective first and second masses. For most of the materials used for the separator layer, the extruder temperature will be from ambient temperature to 180° C. It is preferred that the temperature is less than 150° C., most preferably less than 90° C.

The acceptable residence time in the extruder will depend on the temperature and stress level. In general, the residence time is preferably minimized to maximize the electrical conductivity of the resulting electrode and minimize the amount of electrically conductive additive required for a desired electrical conductivity in the resulting electrode. In particular, when carbon black is used as the electrically conductive additive, excessive shear stress can decrease the conductivity of the carbon black, necessitating an increase in the loading of carbon black in order to compensate for the loss in conductivity. However, an increase in carbon black loading results in a decrease in the loading of the electrochemically active material in the electrode, which in turn results in lower battery performance properties. Also, increasing the carbon black loading can deleteriously affect the mechanical properties of the electrode. The residence time needed will vary with temperature and compositions of the macroscopically homogeneous mass, and should be sufficient to ensure that the first and second masses become plastically formable. In general, a residence time of a few seconds to 20 minutes can be acceptable.

The plastically formable separator mass and electrode mass are forced into the extrusion die 30. It is preferred that the die be a multi-manifold multi-slot die. The separator and electrode materials are forced through the die onto a support 40. In general, the separator layers will have a thickness in the range of about 0.5–5 mils (13–127 microns), preferably 1–3 mils (25–76 microns). The electrode layers will have a thickness in the range of about 2–12 mils (50–300 microns), preferably 3–10 mils (75–250 microns).

Support For Composite Structure

The support 40 may be a current collector, in which case the multilayer structure is deposited with the electrode layer adjacent the current collector. The current collector may be a metal foil, metal-coated polymer film, or metal-coated fiber web. Examples of suitable metals used for current collectors include aluminum, copper, gold, nickel, silver, stainless steel, titanium, zinc, and alloys thereof. It is preferred to use aluminum for the cathode current collector and copper for the anode current collector. One or both of the current collectors may be coated with a primer layer to prevent corrosion, reduce interfacial resistance, and improve adhesion to other layers. Suitable primer layers have been disclosed in, for example, Shi et al., U.S. Pat. No. 5,580,686; Fauteux et al., U.S. Pat. No. 5,578,396; and Turi et al., U.S. Pat. No. 5,478,676. In one embodiment, the current collector may be a porous substrate, such as a metal mesh, metal foam, or wire structure, instead of foil. In general, a porous current collector is encapsulated entirely or in part by the electrode layer.

The support 40 may also be a structure comprising one or more battery layers. For example, the support may be a composite structure comprising a separator layer and an electrode layer. The composite support structure may be formed separately according to the process of the invention, or using other conventional battery processing methods. The composite support structure may include a substrate, which may be a permanent part of the battery structure, or may be removed prior to assembly of the final battery cell. It will be understood that the composite support structure may comprise other combinations of battery layers.

The composite structure of separator and electrode may also be extruded onto a temporary support (not shown). The temporary support may be a plastic releasable substrate, such as polyester, optionally coated with a release agent. Deposition onto the plastic support may be followed by winding into a roll for storage. The structure may then be laminated to a current collector at a later time. The temporary support may also be a casting roll or casting belt. In a continuous process, extruding onto the casting roll or belt is immediately followed by lamination to the current collector, such that the electrode layer is adjacent to the current collector. It is not necessary to maintain the casting roll or belt at the same temperature as the current collector substrate, and it may be advantageous to maintain the current collector substrate at an elevated temperature relative to the casting roll or belt, particularly when it is a metal foil. In all cases where a temporary support is used, the support is removed prior to assembly of the final battery cell.

In one embodiment, a multilayer composite structure comprising a separator layer and an electrode layer is forced through a die onto a temporary support. The separator layer is adjacent to the temporary support. This intermediate structure is then laminated to a current collector layer with the electrode layer adjacent to the current collector. The temporary support is then removed.

When battery layers are formed by solvent coating, it has been found that there is excessive free volume remaining in the coated films after the coating solvent is removed. This leads to lower energy density and inferior battery performance. Typically the free volume is reduced by calendering the coated films, with attendant yield losses and equipment investment. Advantageously, it has been found that the electrode films prepared according to the process of the invention, have almost the theoretical density, as calculated based on the average densities of the components. Thus the films do not require further processing.

It will be understood from the foregoing, that a variety of structures can be prepared using the multilayer extrusion process of the invention. It is also possible to extrude multilayer structures on both sides of a current collector substrate.

In a preferred embodiment, multilayer structures are cast such that separator layers are present on the surfaces of both the anode and cathode, opposite the surfaces where these electrodes are laminated to their respective current collectors. In this manner, the separator layers form interfaces with their respective electrode layers that possess very low interfacial impedance.

In the formation of a battery, the multilayer composite structures are laminated together to form cells. As used herein, the term "cell" is intended to mean a structure having at least one anode, at least one cathode, and at least one separator layer. The term cell encompasses unicells, bicells, and higher multiple cells. Two conventional cell structures can be abbreviated as (III) and (IV) below:

Al/cathode/separator/anode/Cu/anode/separator/cathode/Al    (III)

and

Al/cathode/separator/anode/Cu    (IV)

where Al=aluminum current collector, and Cu=copper current collector. Each separator layer shown above may optionally be formed from two thinner separator layers that were cast along with the anode and cathode by the multilayer extrusion process described above.

These and other variations may be made by laminating together multilayer composite structures formed by the process of the invention. Lamination may be accomplished under moderate conditions of heat and pressure, between belts or in the nip between lamination rolls. Lamination rolls may be hard, e.g., metal, or a combination of metal and elastomerically-covered rolls.

The final battery package, referred to as a "softpack", is a sealed package containing at least one cell with both tab(s) from the anode and tab(s) from the cathode protruding out of the package. If multiple cells are used inside a package, the tabs of each type of electrode are typically connected together inside the package, for example, by welding. In this case, only a single positive and single negative tab protrude from the softpack. The final battery design can be either a monopolar (parallel) or a bipolar (series) arrangement within the soft pack, as is known in the art. Typically several cells, e.g., 5, are stacked together. The packaging material is generally heat sealable and may consist of a laminate of polyester/polyethylene/Al/polyethylene. Electrolyte solution comprising lithium salt dissolved in plasticizer solvent, may be added to the package before sealing.

EXAMPLES

The following examples are illustrative of the invention, but not limiting.

The abbreviations used in the Examples and Comparative Examples below have the following meaning:

| GLOSSARY | |
|---|---|
| BC | butylene carbonate, from Huntsman |
| BETI | bis(perfluoroethyl sulfonyl)imide, lithium salt, from 3M Co. (St. Paul, MN) |
| BETI in EC/BC | 1.0M solution of BETI in a 2/1 mixture of ethylene carbonate and butylene carbonate |
| BMTI | bis(perfluoromethyl sulfonyl)imide, lithium salt, from 3M Co. (St. Paul, MN) |
| carbon black 1 | Super P carbon black from MMM Carbon (Belgium); surface area = 60 sq. m/gram |
| carbon black 2 | Ensaco 350 carbon black from MMM Carbon (Belgium), surface area = 790 $m^2/g$ |
| EC | ethylene carbonate, from E.M. Industries (Germany) |
| graphite | MCMB 25–28 graphite from Osaka Gas Chemicals Co. (Osaka, Japan) |
| HFP | hexafluoropropylene |
| Li-PSEPVE | lithium perfluorosulfonate ethoxy propyl vinyl ether, made according to the procedure in published PCT application WO 99/45048 Examples 3 and 5 |
| $LiCoO_2$ | lithium cobalt dioxide from FMC Corp. (Gastonia, NC) |
| $LiMn_2O_4$ | lithium manganese oxide spinel from E.M. Industries (Germany) |
| PAN | polyacrylonitrile, from Aldrich Chemical Co. (Milwaukee, WI) |
| PC | propylene carbonate, from E.M. Industries (Germany) |
| PEO | polyethylene oxide, MW = 200,000, from Aldrich Chemical Co. (Milwaukee, WI) |
| pVDF | poly(vinylidene fluoride), e.g., Kynar Powerflex ® from Elf Atochem (Paris, France) |
| pVDF-HFP | copolymer of vinylidene fluoride and hexafluoropropylenee.g., Kynar Powerflex ® from Elf Atochem (Paris, France) |
| silica | Cab-O-Sil TS-530 from Cabot Corp. (Tuscola, IL) |

Electrical Conductivity Test

The following procedure provides the conductive measurements provided in the Examples and Comparative Examples:

Electrical conductivity was determined using the so-called four-point probe technique described in an article entitled "Proton Conductivity of Nafion® 117 as Measured by a Four-Electrode AC Impendance Method" by Y. Sone et al., J. Electrochem. Soc., 143,1254 (1996). The method as described applies to aqueous electrolyte membranes. The method was modified for purposes of obtaining the measurements reported herein for solid samples by substituting parallel linear probes traversing the full width of the test specimen for the point probes employed in the published method.

A film sample 1 cm wide and 2 cm long was cut using a template, and placed between flat blocks of Teflon® PTFE (available from E. I. du Pont de Nemours and Company, Wilmington, Del.) approximately 1 cm thick, with width and length slightly larger than the film sample. The parallel linear probes were set in the first of the plastic blocks, flush with or slightly protruding from the surface of the block, and perpendicular to the 1 cm width of the sample. The film sample was placed on the probes, and the second plastic block was placed on top of the film sample to hold it flat against the first block and the parallel linear probes. A small spring clip was used to apply pressure and hold the blocks in place during the measurements.

Impedance was determined in ohms at 1000 Hz using a Fluke RLC meter, model PM6303A, from the Fluke Corporation, Germany. The meter was set to read zero ohms with no sample present. The raw sample impedance was then measured, and converted to conductivity, in S/cm, using the cell constant and film thickness.

Example 1

This example illustrates the improved electrical conductivity of layers in which the components are combined to form a macroscopically homogeneous mass prior to fusing.

A cathode layer was made with the composition given in Table 1 below:

TABLE 1

COMPOSITION

| Cathode | % by weight |
| --- | --- |
| pVDF-HFP | 9.6 |
| LiCoO2 | 62.7 |
| carbon black 2 | 6.3 |
| EC | 10.7 |
| PC | 10.7 |

The lithium cobalt oxide was added to a 5 gallon (19 liter) container. One-third of the EC/PC liquid was sprayed into the container with the $LiCoO_2$ and tumbled for 5 minutes using a Morse Drum Tumbler, Model 2- 305-A, made by Morse, East Syracuse, N.Y. A second third of the EC/PC liquid was added and tumbled for another 5 minutes. The final third of the EC/PC liquid was added and tumbled for 5 minutes. Finally the pVDF-HFP and carbon black were added to the container and tumbled for 5 minutes. At the end of this time, the mixture had the appearance of black talc.

The blend was added to the hopper of a single screw extruder with a twin screw stuffer (Moriyama Pelletizer, Model FR 35, made by Moriyama MFG Works, Ltd., Osaka, Japan). The feed barrel of the hopper was held at 100° C., while the other barrels were held at 115° C. for Barrel 2, and 130° C. for Barrel 3. The mass had a residence time of 30 seconds in the extruder. The melt passed through a transfer line at 130° C., before extruding through a single slot die, gapped at 15 mils (381 microns), at 130° C. onto a polyester support. The electrical conductivity of the film thus formed was measured using the conductivity test detailed above. The results are given in Table 2 below.

Comparative Example 1

The cathode composition of Example 1 was made using a conventional extrusion process in a 28 mm twin-screw extruder, made by Werner & Pfleiderer, Model 135480.

The lithium cobalt oxide, carbon black, and pVDF-HFP were combined in a 5 gallon (19 liter) container and tumbled on the Morse Drum Tumbler for 15 minutes. This mixture was metered into the 28 mm twin-screw extruder using a K-tron Soder, Model#K2MVT20, made by K-TRON, North America (Pitman, N.J.). The feed barrel temperature was 100° C., and the second barrel temperature was at 150° C. The EC/PC liquid was injected into the second extrusion barrel at the rate appropriate for the flow rate for the powders into the feed barrel. A higher extruder temperature was required vs. Example 1 to completely melt the cathode and allow it to flow through the transfer line and slot die. The slot die in this example was gapped to 30 mils (762 microns) and was similar in geometry to the slot die used in Example 1. The total residence time of the melt in the extruder was about 30 seconds. Cathode melt was extruded from the die onto a polyester support. The electrical conductivity of the film thus formed was measured using the conductivity test detailed above. The results are given in Table 2 below.

Comparative Example 2

The cathode composition of Example 1 was made using a conventional process with melt mixing, pelletizing and extrusion in a single-screw extruder.

The cathode components listed in Example 1 were added to a Moriyama dispersion mixer, Model#D3-7.5, made by Moriyama MFG Works, Ltd. The components were all added to the mixer and mixed at 50 rpm at 50° C. for 15 minutes. The mixture was removed from the mixer and allowed to cool to room temperature before pelletizing using a Cumberland Granulator, Model 284 (Cumberland Engineering, Providence, R.I.), to form pellets 1–3 mm in diameter. The pellets were fed into the hopper of the Moriyama Pelletizer, Model FR-35, used in Example 1, using the same conditions as in Example 1. The electrical conductivity of the film thus formed was measured using the conductivity test detailed above. The results are given in Table 2 below.

TABLE 2

ELECTRICAL CONDUCTIVITY

| Sample | Conductivity, S/cm |
| --- | --- |
| Example 1 | 195 |
| Comparative Example 1 | 40 |
| Comparative Example 2 | 67 |

Example 2

This example illustrates the formation of a multilayer structure by multilayer extrusion coating with a multislot die. The structure will have a separator layer on an anode layer on a copper foil current collector.

The layers will have the compositions listed in Table 3 below:

TABLE 3

COMPOSITIONS

| Anode | % by weight |
| --- | --- |
| pVDF-HFP | 7.0 |
| EC/PC (1:1) | 25.0 |
| graphite | 65.0 |
| carbon black 2 | 3.0 |

| Separator | % by weight |
| --- | --- |
| pVDF-HFP | 33.0 |
| EC/PC (1:1) | 45.0 |
| silica | 22.0 |

The macroscopically homogeneous anode mixture will be prepared in a manner similar to the cathode in Example 1, resulting in a mass made up of sand-like particulate solids. The macroscopically homogeneous separator mixture will be similarly treated, resulting in a mass made up of sand-like particulate solids.

The anode mixture will be extruded using conditions similar to those described in Example 1. The separator mixture will be extruded using conditions similar to those described in Example 1. In the extruders, the components will be fused and formed into plastically formable masses. The mass exiting from each extruder will be fed through a heated feed line to one slot of a multislot sheet die of stainless steel made by E. I. du Pont de Nemours and Company, Towanda, Pa. The anode and separator materials will be extruded through the die onto an 18-inch diameter chrome-plated steel casting roll, with the separator layer adjacent the casting roll. The multilayer structure will be laminated to clean copper foil with the electrode layer adjacent the foil, at a temperature of 130° C. The anode layer will have a thickness of 100–200 microns, and the separator will have a thickness of 30–60 microns.

Example 4

This example illustrates the formation of a multilayer structure by multilayer co-extrusion coating with a multi-manifold single-slot die. The structure will have a separator layer on an anode layer on a copper foil current collector.

The layers will have the same compositions as in Example 2. The components for each layer will be mixed and introduced into separate extruders as described in Example 2. The extrusion conditions will be the same as in Example 2. The extrudates will be fed into a multi-manifold, single-slot die, such as that which is available from Cloeren Inc., Orange, Tex. The anode and separator materials will be extruded through the die onto a casting roll and laminated to copper foil as described in Example 2. The resulting multilayer structure will have an anode layer with a thickness in the range of 100–200 microns and a separator layer with a thickness in the range of 30–60 microns.

Example 5

This example illustrates the formation of a multilayer structure by multilayer co-extrusion coating with a feed block and single-manifold single-slot die. The structure will have a separator layer on an anode layer on a copper foil current collector.

The layers will have the same compositions as in Example 2. The components for each layer will be mixed and introduced into separate extruders as described in Example 2. The extrusion conditions will be the same as in Example 2. The extrudates will be fed into a feed block, such as that which is available from Cloeren, Inc., Orange, Tex., and from there into a single-manifold, single-slot die, such as that which is also available from Cloeren, Inc. The anode and separator materials will be extruded through the die onto a casting roll and laminated to copper foil as described in Example 2. The resulting multilayer structure will have an anode layer with a thickness in the range of 50–150 microns and a separator layer with a thickness in the range of 30–100 microns.

Example 6

Example 2 will be repeated, using pVDF homopolymer, in place of the pVDF-HFP copolymer. The temperature of the extruders will be about 100–130° C., and the residence times will be 20–60 seconds. The die temperature will be about 100–130° C. The resulting multilayer structure will have an anode layer with a thickness in the range of 100–200 microns and a separator layer with a thickness in the range of 30–60 microns.

Example 7

Example 2 will be repeated, using polyacrylonitrile, in place of the pVDF-HFP copolymer and forming a cathode layer instead of an anode layer.

The layers have the compositions given in Table 4 below:

TABLE 4

| COMPOSITIONS | |
|---|---|
| Cathode | % by weight |
| PAN | 3.0 |
| Li(Mn$_2$O$_4$) | 49.0 |
| BMTI | 3.0 |
| Carbon black 1 | 3.0 |
| EC | 21.0 |
| PC | 21.0 |
| Separator | % by weight |
| PAN | 6.0 |
| BMTI | 6.0 |
| EC | 44.0 |
| PC | 44.0 |

The temperature of the extruders will be about 100–130° C., and the residence times will be 20–60 seconds. The die temperature will be about 100–130° C. The resulting multilayer structure will have a cathode layer with a thickness in the range of 150–250 microns and a separator layer with a thickness in the range of 30–60 microns.

Example 8

Example 2 will be repeated, using polyethylene oxide, in place of the pVDF-HFP copolymer and forming a cathode layer instead of an anode layer.

The layers have the compositions are given in Table 5 below:

TABLE 5

| COMPOSITIONS | |
|---|---|
| Cathode | % by weight |
| PEO | 3.0 |
| LiV$_2$O$_5$ | 49.0 |
| BMTI | 3.0 |
| Carbon black 1 | 3.0 |
| EC | 21.0 |
| PC | 21.0 |
| Separator | % by weight |
| PEO | 6.0 |
| BMTI | 6.0 |
| EC | 44.0 |
| PC | 44.0 |

The temperature of the extruders will be about 100–130° C., and the residence times will be 20–60 seconds. The die temperature will be about 100–130° C. The resulting multilayer structure will have a cathode layer with a thickness in the range of 150–250 microns and a separator layer with a thickness in the range of 30–60 microns.

Example 9

This example illustrates the formation of a multilayer structure using an ionomer as the polymer. The structure will have a separator layer on an anode layer on a copper foil current collector.

The layers have the compositions given in Table 6 below:

TABLE 6

COMPOSITIONS

| Anode | % by weight |
|---|---|
| Li-PSEPVE | 9.0 |
| Graphite | 58.0 |
| Carbon black 1 | 4.0 |
| BETI in EC/BC | 29.0 |

| Separator | % by weight |
|---|---|
| Li-PSEPVE | 25.0 |
| Silica | 10.0 |
| BETI in EC/BC | 65.0 |

The temperature of the extruders will be about 100–130° C., and the residence times will be 20–60 seconds. The die temperature will be about 100–130° C. The resulting multilayer structure will have an anode layer with a thickness in the range of 100–200 microns and a separator layer with a thickness in the range of 30–60 microns.

Example 10

This example illustrates the formation of a multilayer structure with a cathode layer, using an ionomer as the polymer. The structure will have a separator layer on a cathode layer on an aluminum foil current collector.

The layers have the compositions are given in Table 7 below:

TABLE 7

COMPOSITIONS

| Cathode | % by weight |
|---|---|
| Li-PSEPVE | 8.5 |
| LiCoO$_2$ | 58.0 |
| Carbon black 1 | 7.0 |
| BETI in EC/BC | 26.5 |

| Separator | % by weight |
|---|---|
| Li-PSEPVE | 25.0 |
| Silica | 10.0 |
| BETI in EC/BC | 65.0 |

The temperature of the extruders will be about 100–130° C., and the residence times will be 20–60 seconds. The die temperature will be about 100–130° C. The resulting multilayer structure will have a cathode layer with a thickness in the range of 150–250 microns and a separator layer with a thickness in the range of 30–60 microns.

What is claimed is:

1. A process for forming a multilayer composite structure, said process comprising:
   combining at least one first heat-stable dry component and at least one first heat-stable liquid component to form a macroscopically homogeneous first mass;
   fusing the first mass to form a first plastically formable mass;
   combining at least one second dry component and at least one second liquid component to form a macroscopically homogeneous second mass;
   fusing the second mass to form a second plastically formable mass;
   providing a first die having at least one slot;
   simultaneously forcing the first plastically formable mass and the second plastically formable mass through at least one slot onto a first support to form a first multilayer composite structure; wherein the at least one first heat-stable dry components comprises an active electrochemical material particulate material and an ionomeric polymer; and wherein the polymer comprises monomer units of vinylidene fluoride and 2–50 mol-% of a perfluoroalkenyl monomer unit having a pendant group comprising the radical represented by formula (I):

$$—(OCF_2CFR)_aOCF_2(CFR')_bSO_2X^-(M^+)[YZ_c]_d \quad (I)$$

wherein
R and R' are independently selected from F, Cl or a perfluoroalkyl group having 1 to 10 carbon atoms, optionally substituted by one or more ether oxygens;
a=0, 1 or 2;
b=0 to 6;
M$^+$ is H$^+$ or a univalent metal cation;
X is O, C or N with the proviso that d=0 when X is O and d=1 otherwise, and c=1 when X is C and c=0 when X is N;
when c=1, Y and Z are electron-withdrawing groups selected from the group consisting of CN, SO$_2$R$_f$, SO$_2$R$^3$, P(O)(OR$^3$)$_2$, CO$_2$R$^3$, P(O)R$^3{}_2$, C(O)R$_f$, C(O)R$^3$, and cycloalkenyl groups formed therewith wherein R$_f$ is a perfluoroalkyl group of 1–10 carbon atoms optionally substituted with one or more ether oxygens;
R$^3$ is an alkyl group of 1–6 carbon atoms optionally substituted with one or more ether oxygens, or an aryl group optionally further substituted;
or, when c=0, Y may be an electron-withdrawing group represented by the formula —SO$_2$R$_f'$ where R$_f'$ is the radical represented by formula (II):

$$—R_f''SO_2N—(M^+)SO_2)_mR_f''' \quad (II)$$

where m=0 or 1, and R$_f'$ is —C$_n$F$_{2n}$— and R$_f'''$ is —C$_n$F$_{2n+1}$ where n=1–10, optionally substituted with one or more ether oxygens.

2. The process of claim 1 wherein the at least one first heat-stable liquid component comprise an organic liquid which is capable of plasticizing the ionomeric polymer and has a boiling point greater than 100° C.

3. The process of claim 1 wherein the at least one second heat-stable dry components comprises an ionomeric polymer and carbon black.

4. The process of claim 1, wherein the at least one second heat-stable dry component comprises an ionomeric polymer and at least one carbon having a surface area of at least 200 m$^2$/g.

5. The process of claim 5 wherein the first support is selected from
   (a) a metal foil,
   (b) a metal mesh, and
   (c) a multilayer structure comprising a separator and an electrode.

6. The process of claim 1, wherein the first support is a temporary support having a first temporary side and an opposing second temporary side, such that the first multilayer composite structure has a first structure side adjacent to the first temporary side, and a second structure side opposing the first structure side, and the process further comprises:

providing a sheet having a first side and an opposing second side, said sheet selected from
(a) a metal foil,
(b) a metal mesh, and
(c) a multilayer structure comprising a separator and an electrode;

providing the second structure side to the first side of the sheet; and removing the temporary support from the first structure side to form a multilayer intermediate structure.

7. The process of claim 6 wherein the temporary support is selected from a casting roll, a casting belt, and a releasable substrate.

8. The process of claim 1 where the at least one second heat-stable dry component comprises an ionomeric polymer and at least one carbon having a surface area of at most 100 $m^2/g$.

9. The process of claim 1, wherein the first plastically formable mass is formed by fusing the first mass with at least one third heat-stable dry component.

10. The process of claim 1, wherein the first plastically formable mass is formed by fusing the first mass with at least one third heat-stable liquid component.

11. The process of claim 1, wherein the fusing step takes place in an extruder.

12. The process of claim 1 wherein the at least one first heat-stable dry component comprises a lithium salt.

* * * * *